United States Patent [19]

Maurel

[11] Patent Number: 4,485,075

[45] Date of Patent: Nov. 27, 1984

[54] PROCESS FOR THE EXTRACTION OF ARSENIC FROM AQUEOUS SOLUTIONS CONTAINING ALKALI METAL CARBONATE, SULFATE AND HYDROXIDE OR HYDROGEN CARBONATE AND AT LEAST ON METAL INCLUDING VANADIUM, URANIUM AND MOLYBDENUM

[75] Inventor: Pierre Maurel, Aix en Provence, France

[73] Assignee: Uranium Pechiney Ugine Kuhlmann, Paris, France

[21] Appl. No.: 448,854

[22] PCT Filed: Apr. 8, 1982

[86] PCT No.: PCT/FR82/00068

§ 371 Date: Dec. 7, 1982

§ 102(e) Date: Dec. 7, 1982

[87] PCT Pub. No.: WO82/03620

PCT Pub. Date: Oct. 28, 1982

[30] Foreign Application Priority Data

Apr. 15, 1981 [FR] France ............................... 81 07857

[51] Int. Cl.$^3$ ........................ C01G 39/06; C01G 28/00
[52] U.S. Cl. ........................................ 423/55; 423/15; 423/65; 423/87
[58] Field of Search ....................... 423/15, 65, 53, 55, 423/87

[56] References Cited

U.S. PATENT DOCUMENTS

| 1,690,627 | 11/1928 | Ellis | 423/602 |
|---|---|---|---|
| 2,949,339 | 8/1960 | Marvin | 423/55 |
| 3,151,932 | 10/1964 | Reusser et al. | 423/15 |
| 4,219,416 | 8/1980 | Ramirez | 423/58 |
| 4,406,864 | 9/1983 | Weir et al. | 423/87 |

FOREIGN PATENT DOCUMENTS

| 0001537 | 11/1981 | European Pat. Off. | |
| 2404601 | 4/1979 | France | 423/55 |
| 2460277 | 4/1979 | France | 423/15 |

OTHER PUBLICATIONS

Chemical Abstracts, vol. 86, No. 20, 16 mai 1977, résumé No. 145160n, Columbus, Ohio.

Primary Examiner—Herbert T. Carter
Attorney, Agent, or Firm—McDougall, Hersh & Scott

[57] ABSTRACT

A process for extracting arsenic from aqueous solutions containing alkali metal carbonate, sulfate and hydroxide or hydrogen carbonate, at least one metal selected from the group consisting of vanadium, uranium and molybdenum in the form of an alkali metal salt, and inorganic and/or organic impurities, comprising the steps of caustifying the solution with lime to convert the alkali metal carbonates into hydroxides to precipitate the insoluble calcium salts formed, concentrating the solution by evaporation of the effluent liquids originating from the caustification step to obtain a precipitate substantially comprising alkali metal sulfate wherein the caustification is performed in two steps, consisting of (a) treating the solutions with an amount of lime approximately equal to but less than the stoichiometric amount necessary to convert the alkali metal carbonates into hydroxides as a first precipitate, and (b) after separating and washing the first precipitate, treating the resulting liquor with at least the stoichiometric amount of lime necessary to precipitate the arsenic in solution and the carbonate ions still present. The process is well adapted to the treatments of the liquors originating from the alkaline attack of uraniferous ore.

20 Claims, 1 Drawing Figure

PROCESS FOR THE EXTRACTION OF ARSENIC FROM AQUEOUS SOLUTIONS CONTAINING ALKALI METAL CARBONATE, SULFATE AND HYDROXIDE OR HYDROGEN CARBONATE AND AT LEAST ON METAL INCLUDING VANADIUM, URANIUM AND MOLYBDENUM

BACKGROUND OF THE INVENTION

The present invention relates to a process for purifying aqueous arsenic solutions containing alkali metal carbonate, sulfate and hydroxide or hydrogen carbonate, at least one metal selected from the group consisting of vanadium, uranium and molybdenum in the form of an alkali metal salt and other inorganic and/or organic impurities.

In French patent No. 2,404,601, a process is disclosed for the treatment of solutions containing sodium carbonate, sulfate, hydroxide and/or hydrogen carbonate and at least one metal selected from the group consisting of vanadium, uranium and molybdenum in the form of a sodium salt.

These solutions originate from an attack cycle of a uraniferous or vanadiferous ore, which also may contain molybdenum, after precipitation and separation of the metal which can be used in accordance with known methods.

In the case of a uraniferous ore, for example, the ore, after attack by a sodium carbonate and/or bicarbonate liquor, with the uranium solubilized and present in the liquor after the attack, was usually precipitated in the form of sodium uranate. The sodium uranate could be converted by known means—for example, either by forming crystalline ammonium uranate through sulfur-ammonium transposition upon treating the sodium uranate with a solution of ammonium sulfate, or by sulfuric acid redissolution and precipitation of uranium peroxide by the introduction of hydrogen peroxide.

Regardless of the manner of precipitation and separation of the uranium, these operations produced solutions containing sodium carbonate, sodium sulfate, and free sodium or sodium hydrogen carbonate, which had to be purified before being recycled to the ore attack step.

In addition, French Patent No. 2,404,601 discloses a process for treating the previously described solutions wherein the solutions are treated at a temperature at the most equal to boiling by a quantity of lime from 0.1 to 20 times the stoichiometric amount necessary to convert the carbonates and hydrogen carbonates present in the solution into sodium hydroxide (disregarding the quantity of lime necessary to precipitate the insoluble metallic calcium compounds). Additional steps of the process include separating and washing a first precipitate containing essentially calcium carbonate and a mixture of other organic and inorganic calcium salts, and a sodium hydroxide-enriched liquor, concentrating by evaporation a mixture of the liquor and the wash liquor of the first precipitate until a sodium hydroxide content at most equal to 50% is obtained to cause the formation of a second precipitate, separating the crystals of the second precipitate from their sodium hydroxide-enriched liquor and recovering that enriched liquor.

In that process, the second precipitate was formed essentially of sodium sulfate, which was extracted from the treatment cycle. After the sodium sulfate was removed from the treatment cycle, it could either be utilized in industrial applications or be stored in an appropriate location such as landfill zones, quarries or the like. The sodium sulfate could even be safely disposed of in rivers and streams.

However, the solutions that result from an attack cycle of vanadiferous or uraniferous ores also contain, as a particularly harmful impurity, solubilized arsenic in the form of an alkali metal arsenate, whose solubility is greater in this solution than in a solution having a lower hydroxide concentration.

Since the treatment process described in French Pat. No. 2,404,601 is applied to the above mentioned solutions containing arsenic and in order to avoid the disadvantages relating to the production of the double salt 2 $Na_2SO_4 \cdot Na_2CO_3$ during the evaporation of the liquor that results from an incomplete caustification, applicant proposed to use an amount of lime greater than the stoichiometric amount in order to precipitate the carbonate, arsenate and other organic salts in the form of a first precipitate comprising essentially calcium carbonate and a mixture or organic and inorganic calcium salts, among them arsenate.

However, in spite of its low solubility, the calcium arsenate that is present in the solid effluent formed by this first precipitate, may be an environment-polluting element and requires special and costly precautions for storage, due to the fact that the arsenate is present as a mixture with other precipitated salts. Thus, it appears desirable to selectively extract the arsenic in a form that either permits its utilization or enables easy and non-polluting storage, or even to convert the arsenate into iron arsenate which is extremely insoluble and can be stored without special precautions.

Applicant has found that it is now possible to accomplish the extraction of arsenic according to a new process that avoids the previous disadvantages.

SUMMARY OF THE INVENTION

A process for extracting arsenic from aqueous solutions containing alkali metal carbonate, sulfate and hydroxide or hydrogen carbonate, at least one metal selected from the group consisting of vanadium, uranium and molybdenum in the form of an alkali metal salt, and inorganic and/or organic impurities, comprising the steps of caustifying the solution with lime to convert the alkali metal carbonates into hydroxides to precipitate the insoluble calcium salts formed, concentrating the solution by evaporation of the effluent liquids originating from the caustification step to obtain a precipitate substantially comprising alkali metal sulfate wherein the caustification is performed in two steps, consisting of (a) treating the solutions with an amount of lime approximately equal to but less than the stoichiometric amount necessary to convert the alkali metal carbonates into hydroxides as a first precipitate, and (b) after separating and washing the first precipitate, treating the resulting liquor with at least the stoichiometric amount of lime necessary to precipitate the arsenic in solution and the carbonate ions still present. The process is well adapted to the treatments of the liquors originating from the alkaline attack of uraniferous ore.

DETAILED DESCRIPTION OF THE INVENTION

Figure 1:
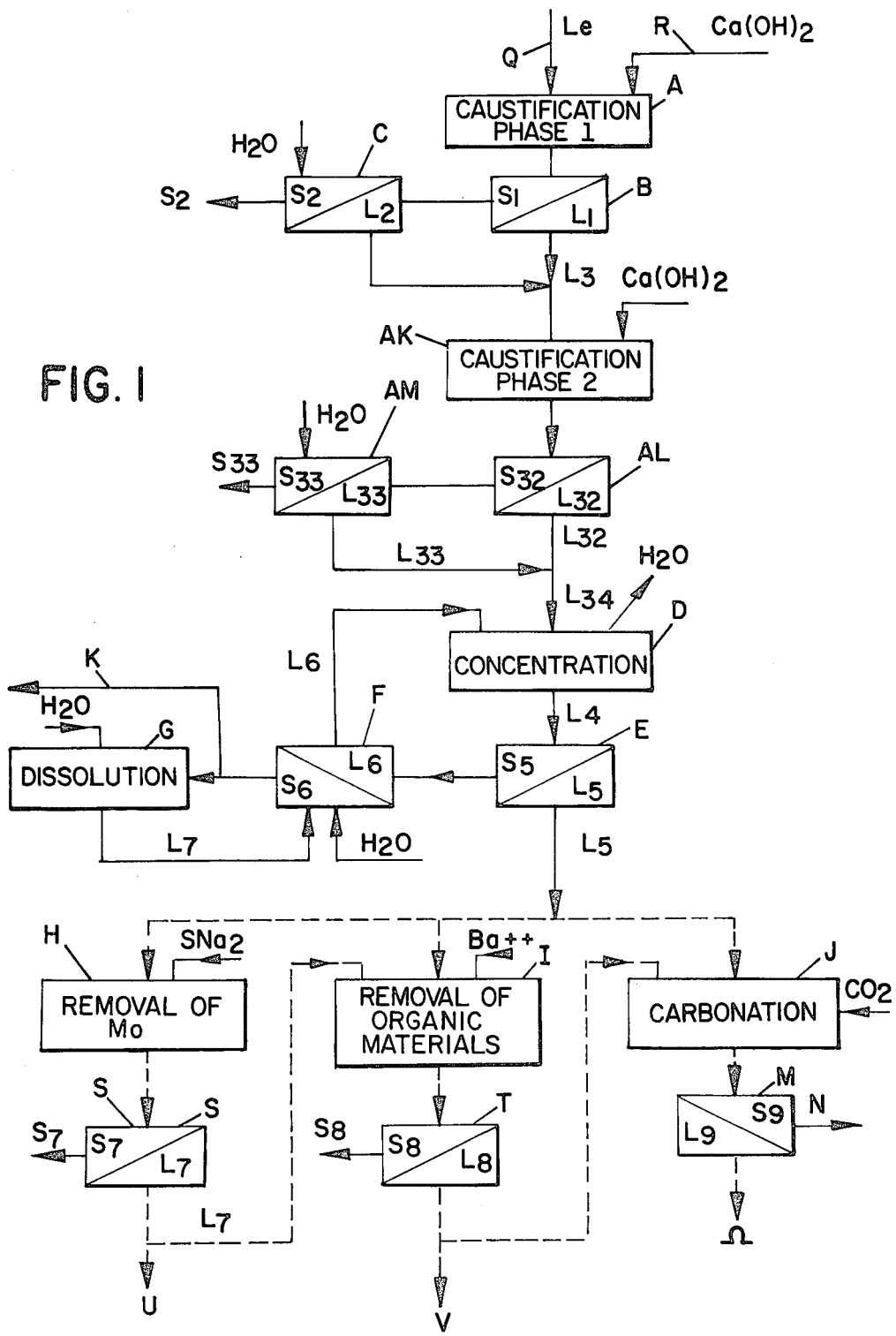
FIG. 1 is a schematic representation of the process according to the present invention.

The present invention relates to a process for the extraction of arsenic from aqueous solutions derived from the alkaline attack of an ore, the solution containing alkali metal carbonate, sulfate and hydroxide or hydrogen carbonate, at least one metal including vanadium, uranium and molybdenum, and inorganic or organic impurities.

As described in French patent No. 2,404,601, the concentrations of alkali metal sulfate, carbonate and hydroxide, or hydrogen carbonate (in the absence of hydroxide) and the concentrations of alkaline compositions and alkaline compounds of at least one of the metals of the group constituted by uranium, molybdenum and vanadium are not critical. Their relative concentrations may vary within wide proportions without disturbing the efficient operation of the process.

The alkali metal compounds are sulfates, carbonates, hydroxides and hydrogen carbonates of sodium, potassium and ammonium. In the following description, however, reference will be made only to sodium compounds, but it will be understood that potassium and ammonium compounds can be treated in the same manner.

In its fundamental form, the present process for the removal of the arsenic contained in the solutions to be purified that originate from the treatment of vanadiferous, uraniferous and/or molybdeniferous ore comprises the following steps, some of which have been described in French patent No. 2,404,601.

(a) The first step comprises caustifying the solution to be purified which contains alkali metal carbonate, sulfate and hydroxide or hydrogen carbonate. In particular, treating the solution with an amount of lime approximately equal to, but less than, the stoichiometric amount (and preferably ranging between 0.80 and 0.98 times the stoichiometric quantity) necessary to convert the carbonates present into alkali metal hydroxides;

(b) Separating a first precipitate impregnated with mother liquor which essentially comprises calcium carbonate from alkali metal hydroxide-enriched liquor and containing alkali metal arsenate or sulfate;

(c) Washing the first precipitate to extract the impregnation liquor;

(d) Combining the liquor resulting from the separation of the first precipitate with its wash solution, said mixture being the solution subjected to the second caustification step;

(e) A second caustification step consisting of treating the solution of the first caustification step with at least the stoichiometric amount of lime necessary to precipitate the arsenic from the solution as a calcium arsenate;

(f) Separating the calcium arsenate precipitate impregnated with mother liquor from the alkaline liquor containing primarily alkali metal sulfate and hydroxide;

(g) Washing the calcium arsenate precipitate with water to form a recycling liquor;

(h) Combining the liquor resulting from the separation of the calcium arsenate precipitate with the wash waters of that precipitate, the mixture constituting the solution subjected to concentration;

(i) Concentrating by evaporation the liquor resulting from the mixture until a third precipitate is obtained, comprising in large part alkali metal sulfate;

(j) Separating the crystals of the third precipitate impregnated with an alkali metal hydroxide-enriched liquor;

(k) Washing the third precipitate by recycling the wash water of the concentration; and (l) Recovering the alkali metal hydroxide-enriched liquor.

The temperature of the caustification treatment is at most equal to the boiling temperature of the solution to be treated. Thus, it is between 20° C. and 110° C., but preferably between 50° C. and 97° C. The precipitation and filterability of the residue obtained is improved in most cases when the caustification temperature is close to the boiling temperature of the solution.

The amount of lime used in the second caustification step is determined by the amounts of residual arsenate and carbonate not converted during the first caustification step and the other organic and/or inorganic salts likely to be precipitated by the lime and present in the liquor subjected to this second caustification. That quantity of lime generally ranges between 1 and 20 times, but preferably between 1.2 and 5 times, the stoichiometric amount required for the precipitation of the arsenate still present, the residual carbonate and the other organic and/or inorganic salts.

The alkali metal hydroxide-enriched liquor originating from the second caustification step is concentrated by evaporation until an alkali metal hydroxide concentration of not more than 50% is obtained and so that the residual alkali metal sulfate content of the liquor after evaporation is adjusted to the desired value, as has already been described in French patent No. 2,404,601.

Because the recovered alkali metal hydroxide-enriched mother liquor still contains impurities, it may be desirable to treat the liquor to extract such elements as molybdenum, organic materials and the like, which would harm its further use.

Likewise, the mother liquor may be subjected to a transformation treatment, as previously described, before being used in the production cycle.

According to one procedure for the elimination of molybdenum, the metal can be precipitated in a known manner; for example, the formation of a molybdenum sulfide by acidification of the alkali metal hydroxide liquor and the addition of an alkali metal sulfide in excess with respect to the stoichiometric amount required.

According to a second procedure for the extraction of organic materials, the alkaline mother liquor is treated in a known manner, for example, with a barium compound by taking advantage of the low solubility of the barium organates in the sodium solution. The barium compound is added in an amount at least equal to the stoichiometric quantity necessary to permit the precipitation and elimination by separation of the organates of the metal. Organic materials can also be extracted with sodium dioxide, causing the degradation "in situ" of the organic materials. In addition, organic materials can be extracted with hydrogen peroxide causing the same degradation or, finally, by passing the liquor over activated charcoal which has the property of retaining the organic elements present in the treated mother liquor.

According to an additional procedure, the alkaline mother liquor can be carbonated partially or totally through contact with carbonic gas according to known techniques, for example by blowing in a large excess of the gas.

According to the characteristics of the alkali metal hydroxide-enriched mother liquor discharged after the evaporation step and the applications for which this purified liquor is intended, it is possible to use any one of these embodiments or to use the described embodiments in combination.

FIG. 1 is a schematic representation of the process according to the invention, showing in solid lines the procedure used when the selective elimination of only calcium carbonate, calcium arsenate and sodium sulfate is desired. In the broken lines, the procedures are shown for performing on the hydroxide-enriched mother liquor, either a supplementary purification of the molybdenum and/or the organic matters, or a carbonation by performing the procedure intended for that purpose, or by performing a complete treatment by the successive application of the previously described procedures.

The alkaline solutions to be treated Le and the lime necessary for the first caustification step are introduced into A by means of Q and R. The slurry produced after treatment with the lime is introduced into zone B for separation of a cake $S_1$ and a liquor $L_1$. The cake $S_1$ is washed in C with an appropriate quantity of water. The wash solutions $L_2$ are combined with the liquor $L_1$ to form a liquor $L_3$. The resulting cake $S_2$ which is extracted from C is essentially formed of calcium carbonate.

The liquor $L_3$ formed by the mixture of liquors $L_1$ and $L_2$ is passed into AK where the second caustification step is performed by introducing the appropriate amount of lime.

The slurry obtained after this treatment is passed into zone AL where a cake $S_{32}$ and a liquor $L_{32}$ are separated. The cake $S_{32}$ is washed in AM with an appropriate quantity of water. The wash solutions $L_{33}$ are combined with the liquor $L_{32}$ to form a liquor $L_{34}$. The resulting cake $S_{33}$ is extracted from AM and consists consists essentially of calcium arsenate.

The liquor $L_{34}$ formed from the mixture of the liquors $L_{32}$ and $L_{33}$ is passed into D for a treatment comprising concentration of the liquor with respect to alkali metal hydroxide by evaporation of water, causing the precipitation of sodium sulfate. The slurry $L_4$ issuing from the concentration step is introduced into E for separation of a liquor $L_5$ and a cake $S_5$.

The cake $S_5$, formed essentially of sodium sulfate, is moved into F where it is washed either with water or with a solution saturated with sodium sulfate, and the wash liquor $L_6$ is recycled to D.

The cake $S_6$ which is impregnated with the wash liquor can be removed from the treatment cycle via K or can be introduced in part with the water into G where the preparation of the wash solution is carried out, i.e., $L_7$, intended to be used in F.

The hydroxide-enriched liquor $L_5$ originating from E can contain impurities in solution; for example, molybdenum, various organic and inorganic salts, the removal of which may be desirable.

If it is desired to remove the molybdenum from the liquor $L_5$, the liquor is passed into H with an appropriate quantity of $Na_2S$. The resulting slurry is passed into S where the solid phase formed of molybdenum sulfide is separated, and the liquor $L_7$ can be collected in U or can be recycled in another step of the process, such as I or J.

If the removal of organic materials from the liquor $L_5$ is desired, the liquor is introduced in I with, for example, an adequate quantity of a barium compound to precipitate barium organates. The slurry originating from I is then passed into T where the separation of a cake $S_8$ and a liquor $L_8$ is performed. The liquor $L_8$ can be recovered in V or can be recycled to another step such as J.

Likewise, if carbonation of the liquor $L_5$, is desired, that liquor is introduced in J to undergo a carbonation reaction by blowing in $CO_2$. The resulting slurry can be used as produced or can be treated at M to separate the cake $S_9$ formed of sodium carbonate and/or bicarbonate and a carbonated liquor $L_9$ which may be recovered in or recycled in J.

However, it is quite evident that the hydroxide-enriched liquor $L_5$ may be subjected successively to two of the three above mentioned treatments, depending on the impurities, removal of which is desirable and on the applications for which this liquor is intended after purification.

For example, the removal of molybdenum and organic materials can be performed in series. In that case, an aliquot portion or the entire volume of the liquor $L_7$ originating from the purification of molybdenum at S is passed into I and then to T to undergo the removal of the organic materials. Conversely, the purification of organic materials can precede the removal of molybdenum.

The removal of the organic materials and the carbonation of the liquor may also be performed successively. In this case an aliquot portion or the entire volume of the liquor $L_8$ originating from T, where the organic materials are eliminated, is passed into J to undergo the desired carbonation reaction.

The process according to the invention is extremely versatile. That is very important because, if the sodium or alkali metal sulfate is generally present in the solutions to be purified, and moreover if alkali metal carbonate is also generally present, the other components present may vary qualitatively and quantitatively depending on the composition of the solutions to be treated. Thus, the process is particularly attractive from an environmental point of view, as it does not involve the dumping of liquid waste.

In addition, this process offers other advantages, among which is the possibility of recycling a concentrated solution of alkali metal hydroxide or a solution of alkali metal carbonate, possibly a suspension of that salt, or even alkali metal carbonate or bicarbonate in the solid state, but it also is possible to selectively control the amount of alkali metal sulfate that is recycled, as well as the amounts of impurities (molybdenum, organic materials, vanadium, etc.).

The advantages of the process according to the invention will be much better appreciated from the following example which is given by way of illustration.

EXAMPLE

A solution containing arsenic was removed at the end of an attack cycle of a uraniferous ore and was treated according to the invention, following precipitation and separation of the sodium uranate.

Of the compounds which are listed in this example, the masses of the different components are expressed in kilograms with the use of only one decimal place, except in the cases of arsenic, uranium and molybdenum, for which the quantities are expressed with up to three decimal places. The fractions of the various components are rounded to the nearest decimal.

The composition of the solution Le was as follows, by weight:

| Component | kg |
| --- | --- |
| NaOH | 2.5 |
| $Na_2O_3$ | 14.6 |
| $Na_2SO_4$ | 12.0 |
| Arsenic | 1.676 |
| Uranium | .009 |
| Molybdenum | 2.635 |
| $H_2O$ and miscellaneous | 320.3 |

353.7 kg of that solution was introduced into A with at least 11.3 kg lime to undergo the first caustification step. The lime represented a slightly insufficient quantity to accomplish the total precipitation of the carbonate ions present in the solution upon heating and maintaining the solution at 95° C. for a time of approximately 3 hours.

The resulting slurry was then decanted to B where a separation of the solid phase $S_1$ and the liquid phase $L_1$ was performed.

The liquor $L_1$ comprises a mass of 338.5 kg and had the following composition:

| Component | kg |
| --- | --- |
| NaOH | 12.1 |
| $Na_2CO_3$ | 1.3 |
| $Na_2SO_4$ | 11.6 |
| Arsenic | 1.619 |
| Uranium | .009 |
| Molybdenum | 2.545 |
| $H_2O$ + miscellaneous | 309.3 |

The cake $S_1$ was washed in C with 25 kg water. The mother liquor that impregnated that cake $S_1$ was extracted and combined with the liquor $L_1$ originating from the separation B.

Cake $S_2$ which had a mass of 19.2 kg had the following composition expressed by weight:

| Component | kg |
| --- | --- |
| $CaCO_3$ | 12.55 |
| $H_2O$ impregnation and miscellaneous | 6.65 |

The liquor $L_3$ formed by the mixture of the liquors $L_1$ and $L_2$ had a mass of 370.8 kg with the following composition by weight:

| Component | kg |
| --- | --- |
| NaOH | 12.5 |
| $Na_2CO_3$ | 1.3 |
| $Na_2SO_4$ | 12.0 |
| Molybdenum | 2.635 |
| Uranium | .009 |
| Arsenic | 1.676 |
| Water and miscellaneous | 340.7 |

The liquor $L_3$ was introduced in AK for the second caustification step by means of 47 kg lime to bring about the precipitation of the small residual quantity of carbonate ions, as well as the precipitation of the calcium arsenate, by heating and maintaining the solution at 90° C. for a period of approximately one hour.

The resulting slurry was decanted into AL where the separation of the solid phase $S_{32}$ and the liquid phase $L_{32}$ was performed.

The liquor $L_{32}$ had a mass of 363.9 kg and the following composition by weight:

| Component | kg |
| --- | --- |
| NaOH | 15.2 |
| $Na_2SO_4$ | 11.8 |
| Arsenic | .496 |
| Uranium | .009 |
| Molybdenum | 2.597 |
| $H_2O$ and miscellaneous | 333.8 |

The $S_{32}$ cake was washed in A, with 10 kg water. The mother liquor which impregnated the $S_{32}$ cake was extracted and combined with the $L_{32}$ liquor originating from the separation step.

The $S_{33}$ cake had a mass of 10.7 kg and the following composition by weight:

| Component | kg |
| --- | --- |
| Arsenic | 1.174 |
| $CaCO_3$ | 1.23 |
| $H_2O$ and miscellaneous | 8.30 |

The $L_{34}$ liquor formed by the mixture of the liquors $L_{33}$ and $L_{32}$, had a mass of 374.8 kg and had the following composition by weight:

| Component | kg |
| --- | --- |
| NaOH | 15.4 |
| $Na_2SO_4$ | 12.0 |
| Uranium | .009 |
| Molybdenum | 2.588 |
| Arsenic | .503 |
| Water + miscellaneous | 344.3 |

The liquor $L_{34}$ was transferred to D where a concentration operation was performed by the evaporation of 316.7 kg water.

The slurry issuing from D was transferred to E, where a cake $S_5$ and a liquor $L_5$ were separated.

The $S_5$ cake was then washed in F with 12.0 kg of a liquor containing 10 kg water and 2 kg $Na_2SO_4$ to yield a cake $S_6$. The wash liquor $L_6$ was recycled in D where it was subjected to the concentration operation.

The cake $S_6$ had a mass of 23.2 kg and the following composition by weight:

| Component | kg |
| --- | --- |
| NaOH | 1.3 |
| $Na_2SO_4$ | 13.5 |
| Molybdenum | 1.395 |
| Arsenic | .043 |
| Water + miscellaneous | 6.9 |

The $L_5$ liquor originating from the separation in E had a mass of 47.0 kg and the following composition by weight:

| Component | kg |
| --- | --- |
| NaOH | 14.1 |
| $Na_2SO_4$ | .5 |
| Uranium | .003 |
| Molybdenum | 1.240 |
| Arsenic | .460 |
| $H_2O$ + miscellaneous | 30.7 |

At the outlet from E, the $L_5$ liquor was used, partly for the precipitation of the sodium uranate and was also subjected to a carbonation step, before being recycled to the attack cycle of the ore.

The wash liquor $L_6$ originating from F and recycled to D had a mass of 13.8 kg and the following composition by weight:

| Component | kg |
| --- | --- |
| NaOH | 1.3 |
| $Na_2SO_4$ | 1.6 |
| Molybdenum | .115 |
| Uranium | .001 |
| Arsenic | .043 |
| $H_2O$ + miscellaneous | 10.6 |

It will be understood that various changes and modifications can be made in the above described method without departing from the spirit thereof, particularly as defined in the following claims.

That which is claimed is:

1. A process for the extraction of arsenic from aqueous arsenate-containing solutions containing alkali metal carbonate, sulfate and hydroxide, or hydrogen carbonate, at least one metal selected from the group consisting of vanadium, uranium and molybdenum in the form of alkali metal salts, and inorganic and/or organic impurities, comprising the steps of caustifying said aqueous solution with lime to convert the alkali metal carbonates to hydroxides, and concentrating the solution by evaporation of the liquids obtained from the caustification step to produce a precipitate containing alkali metal sulfate wherein the caustification of said solution is performed in two steps consisting of (a) treating said solution with a quantity of lime approximately equal to, but less than, the stoichiometric amount necessary to convert the alkali metal carbonates to hydroxides; and (b) after separating and washing the first precipitate, treating the liquor formed with at least the stoichiometric amount of lime necessary to precipitate the arsenate in solution and the remaining carbonate ions.

2. The process according to claim 1, wherein the alkali metal of the carbonate, sulfate, hydroxide and arsenate is selected from the group consisting of sodium, potassium, and ammonium.

3. The process according to claim 1 wherein the amount of lime added in the first caustification step is within the range of 0.80 to 0.98 times the stoichiometric amount necessary to convert the alkali metal carbonates to hydroxides.

4. The process according to claim 3 wherein the amount of lime added in the second step of the caustification is between 1 and 20 times the stoichiometric amount necessary to precipitate the arsenate, the remaining carbonate and the organic and/or inorganic impurities in the solution.

5. The process according to claim 3 wherein the amount of lime added in the second step of the caustification is between 1.2 and 5 times the stoichiometric amount necessary to precipitate the arsenate, the remaining carbonate and the organic and/or inorganic impurities in the solution.

6. The process according to claim 1 wherein the amount of lime added in the second step of the caustification is between 1 and 20 times the stoichiometric amount necessary to precipitate the arsenate, the remaining carbonate and the organic and/or inorganic impurities in the solution.

7. The process according to claim 1 wherein the amount of lime added in the second step of the caustificatin is between 1.2 and 5 times the stoichiometric amount necessary to precipitate the arsenate, the remaining carbonate and the organic and/or inorganic impurities in the solution.

8. The process according to claim 1 wherein the caustification temperature in either step is less than the boiling temperature of the treated solution.

9. The process according to claim 8 wherein the caustification temperature is between 50° C. and 97° C.

10. The process according to claim 1 wherein the liquor originating from second caustification step is concentrated by evaporation until a maximum 50% concentration in alkali metal hydroxide is obtained and until a precipitate containing an alkali metal sulfate is formed.

11. Ihe process according to claim 10 wherein the alkali metal hydroxide-enriched liquor, separated from the precipitate containing alkali metal sulfate, is treated by acidification and the addition of an alkali metal sulfide to precipitate molybdenum sulfide.

12. The process according to claim 10 wherein the alkali metal hydroxide-enriched liquor, separated from the precipitate containing alkali metal sulfate, is treated by the addition of a barium compound in an amount at least equal to the stoichiometric amount necessary to precipitate barium organates.

13. The process according to claim 10 wherein the alkali metal hydroxide-enriched liquor, separated from the precipitate containing alkali metal sulfate, is treated with a compound selected from the group consisting of sodium peroxide and hydrogen peroxide to degrade the organic impurities.

14. The process according to claim 10 including passing the alkali metal hydroxide-enriched liquor, separated from the precipitate containing alkali metal sulfate, over activated charcoal.

15. The process according to claim 10 including treating the alkali metal hydroxide-enriched liquor, separated from the precipitate containing alkali metal sulfate, with carbonic gas to carbonate said liquor.

16. The process according to claim 1 wherein the alkali metal hydroxide-enriched liquor, separated from the precipitate containing alkali metal sulfate, is treated by acidification and the addition of an alkali metal sulfide to precipitate molybdenum sulfide.

17. The process according to claim 1 wherein the alkali metal hydroxide-enriched liquor, separated from the precipitate containing alkali metal sulfate, is treated by the addition of a barium compound in an amount at least equal to the stoichiometric amount necessary to precipitate barium organates.

18. The process according to claim 1 wherein the alkali metal hydroxide-enriched liquor, separated from the precipitate containing alkali metal sulfate, is treated with a compound selected from the group consisting of sodium peroxide and hydrogen peroxide to degrade of the organic impurities.

19. The process according to claim 1 including passing the alkali metal hydroxide-enriched liquor, separated from the precipitate containing alkali metal sulfate, over activated charcoal.

20. The process according to claim 1 including treating the alkali metal hydroxide-enriched liquor, separated from the precipitate containing alkali metal sulfate, with carbonic gas to carbonate said liquor.

* * * * *